United States Patent [19]

Lowder et al.

[11] 4,018,576
[45] Apr. 19, 1977

[54] DIAMOND ABRASIVE TOOL

[75] Inventors: James T. Lowder; Edwin M. Tausch, both of Worthington, Ohio

[73] Assignee: Abrasive Technology, Inc., Columbus, Ohio

[22] Filed: May 8, 1975

[21] Appl. No.: 575,715

Related U.S. Application Data

[60] Division of Ser. No. 388,131, Aug. 14, 1973, Pat. No. 3,894,673, which is a continuation-in-part of Ser. No. 195,705, Nov. 4, 1971, abandoned, and Ser. No. 387,943, Aug. 13, 1973, abandoned, which is a division of Ser. No. 195,705.

[52] U.S. Cl. .............................. 51/309 R; 51/307
[51] Int. Cl.$^2$ .................... B24D 3/06; C04B 31/16
[58] Field of Search ............ 51/309, 293, 298, 295, 51/307

[56] References Cited

UNITED STATES PATENTS

| | | | |
|---|---|---|---|
| 2,138,882 | 12/1938 | Robie | 51/298.1 |
| 2,201,196 | 5/1940 | Williamson | 51/295 |
| 2,233,175 | 2/1941 | Melton et al. | 51/298.1 |
| 3,598,554 | 8/1971 | Dawson et al. | 51/309 |
| 3,630,699 | 12/1971 | Catlin | 51/309 |
| 3,751,283 | 8/1973 | Dawson | 51/309 |

Primary Examiner—Donald J. Arnold
Attorney, Agent, or Firm—Cennamo, Kremblas and Foster

[57] ABSTRACT

An improved diamond abrasive tool and method of manufacture characterized by a direct brazing technique of diamond crystals to a substrate surface which requires no pre-conditioning of the surface of the diamond in order to obtain the necessary wetting thereof. The method employed utilizes readily available, very hard and durable brazing alloys which have been discovered to readily wet the diamond surface to obtain a final product wherein the minimum depth of the alloy bond tends to occur intermediate adjacent diamond crystals with outstanding retention of the crystals and greatly extended tool life.

4 Claims, 2 Drawing Figures

DIAMOND ABRASIVE TOOL

BACKGROUND

This application is a divisional application of our co-pending application Ser. No. 388,131, filed on Aug. 14, 1973, now U.S. Pat. No. 3,894,673, which was a continuation in part of our application Ser. No. 195,705, filed on Nov. 4, 1971, now abandoned, and also is a continuation in part application of our co-pending application Ser. No. 387,943, filed on Aug. 13, 1973, now abandoned, which is a division of the same parent application Ser. No. 195,705, filed Nov. 4, 1971 referred to above. Techniques for promoting the adherence of diamond to metal in the abrasive cutting and grinding tool industry have long suffered many problems. Presently, while attempts to accomplish this purpose by brazing have been made, the drawbacks to these methods have prevented them from replacing the present commercial techniques of electroplating.

One prior art method of a brazing technique is described in U.S. Pat. No. 2,728,631. This disclosure teaches first preparing the surface of the diamond by applying a coating of titanium hydride and then heating the coated diamond in the presence of soft alloys, such as copper and copper-silver types, and a metal substrate to an appropriate temperature to achieve the bond between the diamond and metal base.

Another prior art method consists of conditioning the diamonds by exposure to copious quantities of zinc metal vapor immediately prior to contact with a fused bonding metal.

While the above methods are capable of promoting the adherence of diamond to metal, they are cumbersome and very difficult to practice on an economically feasible level.

Further, each of these methods teach the preference of using a relatively soft braze alloy, typically copper-silver types, in connection with a cumbersome preconditioning technique. Also, the bond achieved by practicing these methods was of poor quality relative to sufficient resistance to swarf abrasion and efficient diamond crystal retention. Therefore commercial diamond abrasive tools are typically manufactured using the old electroplating technique which also leaves much to be desired relative to both cost and product quality.

SUMMARY OF INVENTION

The present invention relates to a novel method of manufacturing diamond abrasive tools by a direct brazing technique which requires none of the conventional techniques for pre-conditioning of the diamond. In general, the method of the present invention revolves about the discovery that certain brazing alloys readily wet the surface of diamond crystals to achieve a very secure bond of the diamond to the metal substrate. These alloys might be best generally described as those brazing and hard surfacing alloys of the cobalt and/or nickel based type which contain certain percentages of chromium. It has been found that this family of brazing alloys may be applied directly to the untreated diamond surface with superior results relative to any prior method. The configuration of the product so formed is unique in that the braze alloy clings to the diamond surface rather than flowing away from it during treatment and therefore greater surface contact between the diamond and the alloy is achieved to provide a more secure bond.

OBJECTS

It is therefore a primary object of the present invention to provide a novel method of attaching diamond crystals to a metal base by a direct brazing process.

It is another object of the present invention to provide a method of the type described which provides a superior bond relative to prior art techniques and which is economically feasible for commercial production.

It is another object of the present invention to provide a diamond abrasive tool which exhibits superior quality relative to the strength and abrasion resistance of the bond between the diamond and the metal substrate and in which the braze alloy bond has its minimum depth at a point intermediate diamond crystals.

It is another object of the present invention to provide a tool of the type described wherein the diamond crystals are more efficiently secured to the metal substrate relative to the quantity of the bonding metal necessary to provide sufficient support.

It is still another object of the present invention to provide a method of the type described which permits the manufacture of abrasive tools employing a monolayer of diamond grains of smaller size than heretofore practical using conventional prior art electroplating techniques.

Further objects and advantages of the present invention will be apparent from the following description, reference being had to the accompanying drawing wherein preferred forms of embodiments of the invention are clearly shown.

DETAILED DESCRIPTION

Figure 1:
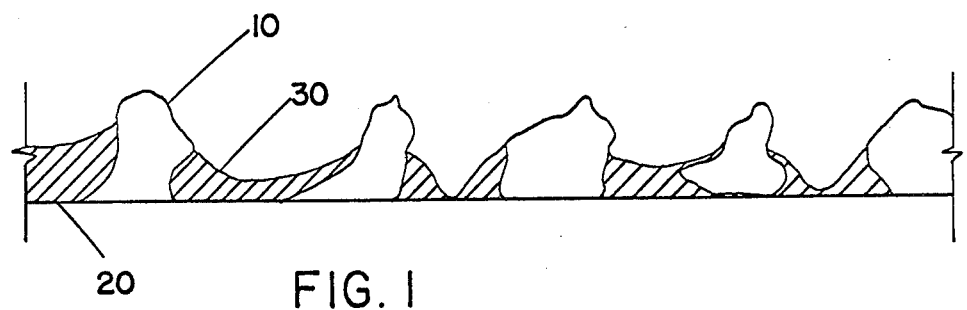

The present invention is embodied in the discovery, which has long eluded those skilled in the art, that diamond crystals may be securely bonded to a metal substrate by employing certain brazing alloys which do not require complex preconditioning of the surface of the diamond crystals.

It has been found that these alloys which readily wet diamond and provide a secure bond which is strong and abrasion resistant are typified by the nickel-chromium or cobalt-nickel-chromium family of brazing and hard surfacing alloys. While many modifications and additions to these basic components are possible and appear desirable in a certain range of compositions, certain combinations of chromium with nickel or cobalt appear to be essential in order to achieve commercially acceptable results within the spirit of the present invention.

The nickel and cobalt provide a very strong, corrosion resistant base for the alloy. All available tests indicate that chromium appears to be the principal wetting agent in these types of alloys which provides in the composition the capability to sufficiently wet the diamond surface to form an effective bond configuration. Further, chromium appears to add desirable hardness to the alloy. Elements such as boron, silicon and phosphorous are necessary to lower the melting point of the alloy and are theorized to aid the fluidity of the molten alloy, to function as fluxing agents, and in appropriate amounts, to increase or maintain the alloy hardness without detrimentally increasing the brittleness of the alloy.

Other elements in relatively smaller percentages such as iron and carbon appear to be merely incidental to the manufacture of these alloys as they are present in the normal starting materials. Other elements which appear in some compositions tested include amounts, generally less than ten percent, of tungsten or manganese which are not necessarily essential but do not appear to aid or impair significantly the diamond bonding capability.

A wide range of compositions have been tested and those alloys which are in the family known in the art as brazing and hard surfacing alloys which include certain amounts of the essential element of chromium in a nickel or cobalt base appear to operate functionally in the present invention. Since many of these alloys are available commercially it should readily be appreciated that the majority of tests have been conducted using those commercially available compositions for economic reasons.

However, these tests indicate certain limitations relating to the essential metals. For example, it strongly appears that compositions including less than approximately 2 percent chromium do not wet the diamond surface sufficiently to form an operable bond capable of commercial abrasive tool usefulness. Further, as the percentage of chromium increases between 2 to about 5 percent, relatively good wetting and operable bonding is achieved. However, above a chromium content of roughly 5 percent, the wetting ability which permits excellent bond formation to occur, appears to be improved substantially over those compositions having less than about 5 percent chromium.

Also it is noted that compositions having an increasing chromium content between 6 and 26 percent showed no significant increase in wetting ability relative to one another so as to effect bonding characteristics. Apparently once sufficient wetting ability is achieved to assure that the alloy clings well to the diamond surface, no readily observable change in bond configuration or increased retention characteristics are obtained.

The test data clearly indicated that excellent wetting and crystal retention was achieved in the range of compositions which includes between 6 and 26 percent chromium. From these tests no results were noted to lead us to expect that greater amounts than 26 percent chromium would render significantly better wetting characteristics.

However, on the other hand, we would expect that a chromium content greater than 26 percent would work quite well relative to obtaining sufficient wetting of the diamond crystals.

Therefore, the upper limit of the chromium content would most likely be determined at some point near the eutectic composition of a nickel-chromium or cobalt-chromium system wherein the increase of the melting point requires an increase in the processing temperature to the detriment of the diamond crystals. In addition, this upper limit may be affected by the other characteristics, such as hardness, ductility or brittleness which would interfere with the usefulness of the resultant alloy relative to the purposes of the present invention. In this connection, it clearly appears that the chromium content need not vary significantly from the 6 to 26 percent range in order to achieve the very excellent wetting and bonding characteristics which are desired. Therefore higher chromium contents which would be expected to work well within the spirit of the present invention do not appear to offer any substantial advantages as compared to the total range relative to increased wetting ability of the alloy for the purposes of bonding diamond crystals.

Relative to the melting point of the given alloy within the general composition limits disclosed herein, it should be pointed out that processing temperatures above 1300° C are very undesirable. Thermal degradation of the diamond crystals above this temperature is likely to be serious enough to substantially interfere with the usefulness of the tool. In fact, processing temperatures below 1200° C are greatly preferred.

The nickel and cobalt metals, which form the alloy base and provide the desired strength and durability necessary to achieve a good bonding medium for abrasive tool applications appear to be generally somewhat interchangeable. Operable compositions tested within the spirit of the present invention include those having 17 to 92 percent nickel and up to 52 percent cobalt.

Up to approximately a total of 12 percent, but preferably no greater than approximately 10 percent, of the elements boron, silicon and phosphorous, individually or in combination, function very well in these alloy systems to achieve the desirable lowering of the melting point and provide a desirable fluxing action. Higher percentages may not be desirable when any detrimental increase in the brittleness of the alloy is noted.

Therefore, in general, it should be pointed out that alloy systems including preferably at least approximately 60 percent or more of nickel or cobalt or a combination of those metals and at least more than approximately 2 percent, but preferably above approximately 5 percent chromium, are essential to the method of the present invention. Further, boron, silicon and phosphorous are very desirable at least in contributions up to about 12 percent but preferably less than 10 percent.

In view of the commercially available alloys within these general limits which heretofore were used for completely different purposes, there appears to be no significant advantages to be gained by employing compositions containing a chromium content much greater than about 30 percent.

It should also be pointed out that within the general limits noted herein, some alloy compositions give better results than others or are easier to work with than others for the purposes of the method of the present invention dependent upon the specific process materials and circumstances.

In practicing the invention, it is convenient to use a temporary binder or other means to hold the diamond grains and braze alloy particles in place against the metal surface to which the diamonds are to be attached. This binder may be of a fluxing type or simply a resinous compound dissolved in a suitable organic solvent. It is important that the binder not be a source of oxygen because the atmosphere in the furnace should be as substantially free of oxygen as economically reasonable to assure the proper flow of the braze alloy. The presence of oxygen inhibits the wetting of the diamond by permitting oxides to form on the surface of the braze. Upon preparation of the substrate, braze alloy, and diamond assembly, the whole is submitted to a furnace cycle in a reducing atmosphere or a vacuum and heated until the braze flows and wets the diamond crystals and metal substrate. An entire furnace cycle need take no longer than is employed when following standard brazing practices for metals. The optimum brazing temperature is generally slightly higher than the liquidous temperature of the alloy because good fluidity of the braze is required.

The process may be performed in two steps rather than a single one and in some cases this may be desirable. In the two step process, the brazing alloy would be applied in the same manner as described above, however, the diamond crystals would not be present. After the braze alloy has been fused, the diamond crystals would be attached to the layer of braze alloy on the metal substrate by use of a temporary binder and then the combination would proceed through the furnace cycle again. The same level of diamond bonding is achieved in this two-step method as in the one-step method; however, a somewhat greater control of surface uniformity of the abrasive tool may be achieved in the two-step method. If greater uniformity is desired, the braze coated surface may be machined before the step of applying the diamond.

Application of the described invention to the manufacture of diamond abrasive tools encompasses a great variety of sizes, shapes, and types of tools from extremely thin abrasive discs to large diameter grinding wheels and saw blades. Acceptable substrate or mandrel materials are readily found among the plain carbon and alloy steels. Tool and stainless steels are particularly suitable because of their general resistance to warpage or dimensional instability during the necessary thermal processing.

Figure 2:
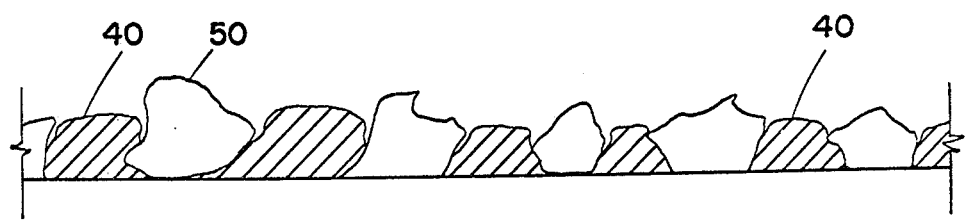

Such grinding and cutting tools made in accordance with this invention exhibit superior performance compared to conventional monolayer type tools. Improvements in such performance criteria as stock removal rate, tool wear, surface finish, heat generation and diamond economy are observed. All such improvements are related to the fact that the invention provides for better bonding of the diamond grains with less bond metal than has been possible previously. It is not possible to predict for an individual braze alloy whether a true metallurigical bond exists between the alloy and the diamond upon completion of the bonding process. The shear stresses which develop because of differential thermal expansion and contraction between the diamond and the enveloping bond are sufficient in most cases to destroy bonding at the interface unless the bond is so ductile as to allow yielding. Regardless, the invention provides the optimum of support for each and every crystal because during the fusing of the braze alloy the side and bottom surface of each crystal are wetted by the alloy and a "setting" is formed. This aspect of the invention is shown in FIG. 1 which depicts a cross section of diamond grains 10 brazed to a tool surface 20. The bond surface 30 is characterized as "concave", ie, the alloy metal bond depth is at a minimum at a point intermediate adjacent crystals. A cross section of the characteristic structure of an electroplated diamond tool is shown in FIG. 2. The surface contour of the bonding metal 40 is inherently convex in electroplated tools, thus providing minimal support for the diamond crystals 50 for a given depth of bond metal.

It should also be pointed out that the process of the present invention has significant advantages as compared to prior processes for making abrasive diamond tools. For example, the bond depth between individual crystals can be "custom designed" for a given application in a simple and inexpensive manner by merely controlling the amount of braze powder applied to the substrate. In a similar manner, it is much easier to control the placement and distribution of the diamond crystals over the tool surface. This is particularly advantageous in critical wear areas such as small rounded tip portions, corners or edges of given tool shapes.

Further, the uniformity of bonding over the entire tool surface is accomplished in a much more simple and convenient manner compared to prior brazing attempts which were dependent upon maintaining a uniform ratio of zinc vapors or titanium hydride to the braze over the entire substrate surface.

The product resulting from the practice of the present invention evidences these advantages over present commercial tools of this kind. The relative ease of control of the bond depth and crystal distribution directly permits a higher quality tool to be manufactured. The strength and durability of a single homogenous alloy bond of the disclosed composition exhibits the desirable bond configuration and represents a significant advance in monolayer tool construction. This advance is particularly evidenced by a comparison of the mode of tool wear between a product produced by the process disclosed herein and prior commercially electroplated tools. In prior monolayer tools, the mode of tool wear relative to tool life is determined primarily by crystal pullout; that is, the diamond bonding medium fails prior to the diamond crystal becoming "flattened" by abrasion.

In a brazed tool made by the process of the present invention, the mode of tool wear is primarily individual crystal flattening due to abrasion and fracture. Therefore, it should be readily appreciated that in such a tool, the diamond crystals are being used to their fullest extent because the bonding strength holding the crystal in place is sufficiently strong to permit the maximum utilization of the diamond crystal.

Actual comparisons to date of diamond tool life for dental applications between electroplated tools and "brazed tools" made by the process of the present invention clearly indicate that such brazed tools have a useful life up to six times greater than electroplated tools under similar use conditions. Further, brazed tools made in accordance with the present invention generally average a useful life span at least two to four times greater than commercially available electroplated tools subjected to substantially equivalent use conditions.

It should be noted that all percentages expressed herein are expressed on a weight percent basis.

Typical examples of the practice of the invention are as follows:

EXAMPLE I

A small quantity of pre-alloyed braze metal in the form of minus 325 mesh particles of the composition chromium (7.0%), boron (2.9%), silicon (4.5%), iron (3.0%), carbon (less than 0.1%), and nickel (balance) was mixed into a solution of 2-ethoxyethyl acetate saturated with a foamed urethan. The braze "paint" was applied by brush to a 1/16 diameter tool mandrel of M-2 steel. Without allowing the braze "paint" to dry, 100/120 mesh diamond crystals were applied uniformly over the braze by sprinkling from a sieve. The assembly was then dried at 225° F for 10 minutes to remove excessive volatiles. The assembly was then placed into a furnace (maintained at 2000° F) for 6 minutes in a dry hydrogen atmosphere and cooled under same. The urethan binder successfully held braze and diamond particles to the mandrel but volatilized during the furnace treatment. The resultant tool consisted of a monolayer of diamond crystals firmly bonded to that portion of the tool to which they were applied with very good protrusion of each crystal above the bond metal surface.

Tools fabricated in this manner and similar in size, shape and diamond crystal size to commercially available tools were submitted to experienced practioners in the dental field for evaluation in high speed air turbine grinders. The opinions of these practioners were virtually unanimous; the tool manufactured by this invention was superior in all respects to the best commercially available tools (all of which are electroplated tools).

EXAMPLE II

The procedures of Example I were followed with the exception that the braze was applied and fused in a furnace cycle before application of the diamond. Following this, the braze surface was wetted with the binder solution and diamond crystals applied by sprinkling. A second furnace cycle resulted in the bonding of the diamonds by the braze metal. This technique provides an extremely precise method of controlling the surface regularity or contour of the diamond crystals. The braze could be applied and fused to a profiled tool surface and then machined to exact conformity before applying the diamond crystals.

EXAMPLE III

The procedures of Example I were followed with the exception that the braze alloy was of the following composition: Chromium (13.5%), boron (3.0%), silicon (4.25%), iron (4.75%), carbon (0.75%) and nickel (balance). Adhesion of 120/140 mesh diamond crystals to a type 416 stainless steel mandrel was excellent and tools thus fabricated exhibited rapid cutting action and great durability in glass, quartz and porcelain ceramics.

EXAMPLE IV

"Test strips" employing 0.005 thick carbon steel substrates were fabricated by the procedures of Example I to examine the characteristics of two additional braze alloys in wetting and bonding diamond crystals. A chromium (13.0%), phosphorus (10.0%) and nickel (balance) alloy bonded 120/140 mesh diamond crystals securely to the steel strip. A boron (3.0%), silicon (4.5%), and nickel (balance) alloy exhibited no tendency toward wetting and bonding of the diamond crystals to the substrate.

EXAMPLE V

The same general procedures of Example I were followed except the furnace temperature was 1160° C and the braze alloy was of the following composition: Chromium (19.0%), boron (0.8%), silicon (8.0%), nickel (17.0%), tungsten (4.0%), carbon (0.4%), cobalt (balance). Adhesion of 120/140 mesh diamonds was excellent and tools thus fabricated exhibited similar excellent cutting action as noted in the previous examples.

EXAMPLE VI

The same general procedure as outlined in Example I was followed except for an increase of furnace time to 8 minutes at 1150° C and by use of an alloy having the following composition: Chromium (21.0%), silicon (3.0%), boron (3.2%), cobalt (44.0%), iron (1.0%), nickel (17.0%), carbon (0.8%) and tungsten (10.0%). The resulting tools exhibited substantially similar characteristics as the tools noted in the previous examples.

EXAMPLE VII

The same general procedures as outlined in Example VI were followed except the furnace temperature was 1120° C and the braze alloy was of the following composition: Chromium (26.0%), silicon (4.0%), boron (3.3%), iron (1.0%), carbon (0.95%) and nickel (balance). The resulting tools exhibited similar excellent bonding and durability as noted in the previous examples.

EXAMPLE VIII

The same general procedures as outlined in Example I were followed except the furnace temperature was 1160° C and the braze alloy was of the following composition: Chromium (19.5%), silicon (9.6%), manganese (9.5%), and nickel (balance). The resulting diamond tool exhibited similar excellent characteristics of wetting and strength as observed in the previous examples. EXAMPLE IX The same general procedures as outlined in Example I were followed using a braze alloy of the following composition: Chromium (2.25%), boron (1.7%), silicon (2.75%), iron (1.0%) and nickel (balance). The resulting tool exhibited operable wetting and crystal retention characteristic, however, the bond developed, while acceptable, was not as excellent as noted in the previous examples.

What is claimed is:

1. A diamond abrasive tool comprising, in combination, a metal substrate and a monolayer of diamond crystals bonded on said substrate by a braze alloy comprising approximately 60 to 92 percent by weight of one of the metals selected from the group consisting of nickel and cobalt or mixtures thereof and no more than approximately 12 percent of one or more of the elements selected from the group consisting of boron, silicon and phosphorous and a chromium content between at least approximately 2 to approximately 30 percent by weight, said tool characterized by a configuration wherein the braze alloy bond has its minimum depth at a point intermediate adjacent crystals.

2. The diamond tool of claim 1 wherein said braze alloy includes more than approximately 5% and less than approximately 26 percent chromium and one or more metals taken from the group comprising boron, silicon, and phosphorus which individually or together comprise no more than 10% of the alloy.

3. A diamond tool comprising in combination, a metal substrate and a monolayer of diamond crystals bonded on said substrate by an alloy comprising approximately 60 to 92 percent nickel, between approximately 5 and 15 percent chromium and less than approximately 10 percent of one or more elements selected from the group consisting of boron, silicon and phosphorus said tool being characterized by a configuration wherein the braze alloy bond exhibits a minimum depth at a point intermediate adjacently bonded crystals.

4. A diamond tool as defined in claim 3 wherein said braze alloy includes less than a total of approximately 12 percent by weight of one or more elements taken from a group consisting of boron, silicon and phosphorus and possesses a melting point of less than approximately 1200° C.

* * * * *